Patented Jan. 20, 1925.

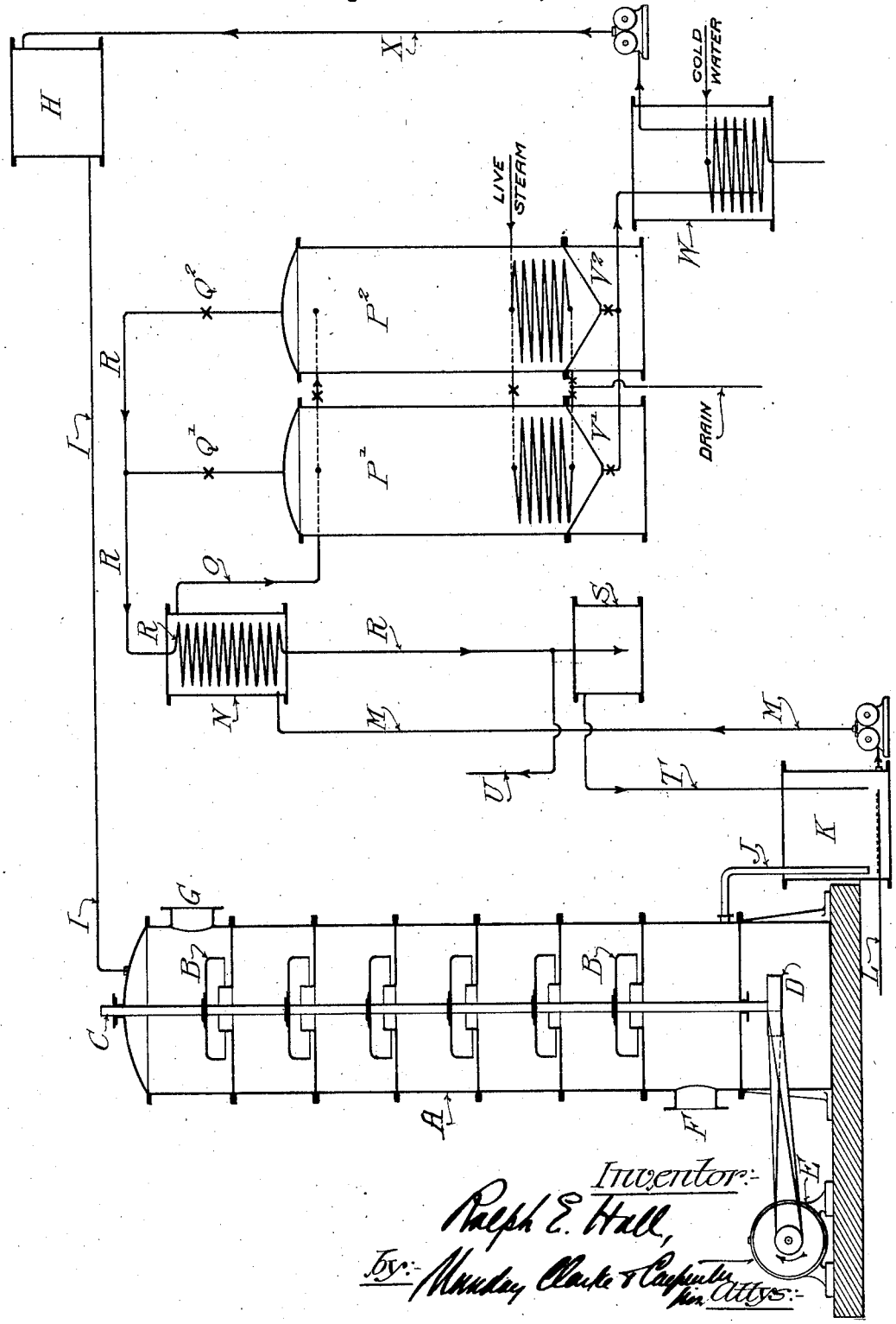

1,523,872

UNITED STATES PATENT OFFICE.

RALPH E. HALL, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

RECOVERY OF HYDROGEN SULPHIDE.

Application filed December 8, 1921, Serial No. 520,804. Renewed June 5, 1924.

*To all whom it may concern:*

Be it known that I, RALPH E. HALL, a citizen of the United States, residing in Pittsburgh, in the county of Allegheny and State of Pennsylvania, have invented a new and useful Improvement in the Recovery of Hydrogen Sulphide, of which the following is a specification.

This invention relates to the manufacture of hydrogen sulphide and has for an object to produce concentrated or substantially pure hydrogen sulphide from gases which contain it. The process of the invention is especially suitable for the treatment of gases which contain but moderate amounts of carbon dioxide in proportion to the hydrogen sulphide content. A typical example of such gases is the gas produced in the distillation and cracking of petroleum, as this gas may contain five per cent or more of hydrogen sulphide by volume, but very little or no carbon dioxide. The process is, however, also applicable to the treatment of other gases, such as coke oven gas, produced or treated in such a manner as to have a relatively moderate content of carbon dioxide. It is the purpose of the invention to treat gases, such as those above mentioned, in such a way as to remove part or all of their hydrogen sulphide content and to recover the thus removed hydrogen sulphide in a concentrated form, so that it may be employed for any desired purpose, for example, for the manufacture of sulphuric acid.

In addition to the general objects recited above, the invention has for further objects such other improvements or advantages in operation or results as are found to obtain in the apparatus and processes hereinafter described or claimed.

In the accompanying drawing, forming a part of this specification, and showing, for purposes of exemplification, a preferred form and manner in which the invention may be embodied and practiced, but without limiting the claimed invention specifically to such illustrative instance:

The figure illustrates a diagrammatic representation of apparatus for carrying out the improved process of the present invention.

When gaseous mixtures which contain hydrogen sulphide, for example, coal gas, water gas, producer gas, and the like, are washed with an alkaline liquid, such as a solution of alkali-metal hydroxide or carbonate, the hydrogen sulphide is removed. Furthermore, absorption of hydrogen sulphide is effected by the employment of water suspensions of alkaline earth hydroxides or oxides and of magnesium oxide, hydroxide, or carbonate. According to the present invention, the hydrogen sulphide from gases is readily and quickly absorbed with a suspension of magnesium oxide or hydroxide, carbonate or basic carbonate, in a solution of alkali-metal carbonate. The suspension in such a solution possesses the advantage of alkalinity, with the result that hydrogen sulphide is very readily absorbed by the alkaline solution. As soon as the hydrogen sulphide is absorbed, however, it immediately goes into intimate contact with the magnesium compound suspension, whereupon magnesium hydrosulphide forms, substantially preventing the formation of alkali-metal hydrosulphide, thereby freeing the alkaline solution or regenerating it for further absorption of hydrogen sulphide. Moreover, the absorption is substantially independent of the relatively slight solubility of the magnesium compounds, for the reason that the alkaline solution merely acts as the carrier for the absorption of the hydrogen sulphide by the suspension and is immediately regenerated for further absorption of hydrogen sulphide. This characteristic of the alkaline solution-suspension also permits the employment of very dilute alkaline solutions. For example, a unit weight of magnesium carbonate, in forming magnesium hydrosulphide, unites with the same quantity of sulphur as 1.26 units of weight of sodium carbonate in forming sodium hydrosulphide, or 1.64 units of weight of potassium carbonate in forming potassium hydrosulphide. Thus, a two per cent solution of sodium carbonate, holding in suspension four per cent of magnesium carbonate, has substantially the same capacity for absorption of hydrogen sulphide as a seven per cent solution of sodium carbonate alone. The fouled solution-suspension may be readily actified or regenerated by heating, inasmuch as the partial pressure of hydrogen sulphide over such a fouled solution-suspension increases rapidly as the temperature rises. Consequently, by boiling the fouled solution-suspension, the content of absorbed sulphur may be largely reduced or entirely eliminated. When employed for the absorption of hydrogen sulphide from gases containing carbon dioxide, the latter is readily absorbed by the alkaline solution-suspension. The absorption of carbon dioxide by the solution-suspension will not affect the ultimate character of the solution-suspension, whether the suspension be magnesium oxide, magnesium hydroxide, magnesium carbonate, or a basic carbonate of magnesium. During the absorption stage, the magnesium suspension will change to hydrosulphide and carbonate; in the regeneration of the fouled solution-suspension, a basic carbonate will result. In such condition, the suspension is an especially good absorbent for the hydrogen sulphide in the gas. Furthermore, any incidental formation of thiosulphate or thiocyanate (from any hydrocyanic acid in the gas) is advantageous, for the reason that such formation will cause a rise in the boiling point of the solution-suspension, with the result that actification is promoted, because of the greater partial pressure of hydrogen sulphide at higher temperatures.

In accordance with the invention, there is thus developed a continuous cyclic process for the removal of hydrogen sulphide from gas, with the recovery of the hydrogen sulphide in concentrated form. In carrying out such a process, the gas is treated with an alkaline solution containing in suspension a magnesium compound, such as magnesium hydroxide, magnesium oxide, magnesium carbonate, or basic carbonate. The solution-suspension containing the absorbed hydrogen sulphide may then be heated to cause it to give up the hydrogen sulphide and to regenerate the solution-suspension for further absorption of hydrogen sulphide. After heating, the regenerated solution-suspension is cooled and recirculated to bring it again in contact with the hydrogen sulphide bearing gas. Any loss in material, whether mechanically or through secondary reactions, may be made up by adding magnesium compound to the system.

The accompanying drawing illustrates diagrammatically one arrangement of apparatus for carrying out the process, although it will be understood that many modifications and many other arrangements of apparatus may be employed. The gas containing hydrogen sulphide may be treated in a rotary gas scrubber A which is especially adapted for the treatment of gas with suspensions or emulsions. A scrubber of this type embodies a casing divided into compartments by trays having central openings, with rotating bells B in each compartment which are attached to the shaft C, the latter being driven through the power connection D by motor E. The gas containing hydrogen sulphide enters the bottom of the scrubber through the pipe F and passes through the different compartments, in countercurrent to the solution-suspension, and emerges through the pipe G. The suspension, such as a suspension of magnesium hydroxide in a solution of sodium carbonate, is drawn from the supply tank H through the pipe line I and discharges into the top compartment of the scrubber. Suspensions of different strengths may be employed; a satisfactory suspension, however, is a four per cent suspension of magnesium hydroxide in a two per cent solution of sodium carbonate. The solution-suspension containing the absorbed hydrogen sulphide flows out of the scrubber through the pipe J into the tank K. Here it may be kept in agitation by air or steam blown through the pipe L. From the tank K the suspension is pumped through the line M into the preheater N where it is heated by the steam and gases from the evaporators. The preheated suspension then flows through the line O into one of the two evaporators P' and P². These may be of continuous or intermittent type. Intermittent operation will be described here.

The suspension is pumped into evaporator P' until this is full and then into P². The first evaporator is heated to the boiling point and hydrogen sulphide is rapidly evolved, passing through the pipe Q' to the line R which is connected with a coil of the preheater N. The cooling effect of the preheater may be supplemented by a condenser in which the vapors are further cooled by fresh air. The steam is condensed and the condensate carrying a little hydrogen sulphide, runs into the tank S, from which the condensate may be returned through the line T to the tank K. The bulk of the hydrogen sulphide passes out through the line U and may be utilized as desired, e. g., for the manufacture of sulphuric acid. When the contents of the evaporator P' have been sufficiently heated so that the solution-suspension is regenerated, the heating is discontinued and the valve in the line Q' is closed. Valve V' is opened and the contents of the evaporator are allowed to drain into the cooling tank W provided with cooling coils through which water is circulated. The contents of this tank are preferably kept in agitation by air or by mechanical means. In other arrangements, the hot suspension from the evaporator may be used to assist in preheating the suspension going to the evaporators.

In the meantime, evaporator P² will be filled and heated, the hydrogen sulphide and steam passing out through the line Q². The operations of filling, heating and emptying are conducted alternately in the two evaporators. It may be advantageous to employ vacuum in the operation of heating since the removal of the hydrogen sulphide is greatly facilitated thereby. Steam directly injected into the contents of the evaporator also assists in accelerating the reactions. The expulsion of hydrogen sulphide from the suspension during the heating may also be facilitated by passing air or other gases through the suspension in the heating apparatus.

From the cooling tank W, the suspension is pumped through line X to the tank H from which it is circulated again over the gas in the scrubber A.

The invention as hereinabove set forth may be variously embodied within the scope of the claims hereinafter made.

I claim:

1. The process of producing hydrogen sulphide, which consists in: passing a hydrogen sulphide bearing gas into contact with a solution of sodium carbonate containing in suspension magnesium hydroxide, the sodium carbonate acting as the carrier for the absorption of hydrogen sulphide by the magnesium hydroxide in suspension; then subjecting the solution-suspension containing the absorbed hydrogen sulphide to a preheating operation; then heating the preheated suspension to expel the hydrogen sulphide to regenerate the solution-suspension; the liberated vapors being employed for preheating the solution-suspension going to the heating operation; and cooling the regenerated solution-suspension and passing it back to the gas treatment stage; substantially as specified.

2. The process of producing hydrogen sulphide, which consists in: passing a hydrogen sulphide bearing gas into contact with a solution of sodium carbonate containing in suspension a magnesium compound having an affinity for sulphur, the sodium carbonate acting as the carrier for the absorption of hydrogen sulphide by the magnesium compound having an affinity for sulphur in suspension; then subjecting the solution-suspension containing the absorbed hydrogen sulphide to a preheating operation; then heating the preheated suspension to expel the hydrogen sulphide to regenerate the solution-suspension; the liberated vapor being employed for preheating the solution-suspension going to the heating operation; and cooling the regenerated solution-suspension and passing it back to the gas treatment stage; substantially as specified.

3. The process of producing hydrogen sulphide, which consists in: passing a hydrogen sulphide bearing gas into contact with an alkaline solution containing in suspension a magnesium compound having an affinity for sulphur, the alkaline solution acting as the carrier for the absorption of hydrogen sulphide by the magnesium compound; then subjecting the solution-suspension containing the absorbed hydrogen sulphide to a preheating operation; then heating the preheated suspension to expel the hydrogen sulphide to regenerate the solution-suspension; the liberated vapors being employed for preheating the solution-suspension going to the heating operation; and cooling the regenerated solution-suspension and passing it back to the gas treatment stage; substantially as specified.

4. The process of producing hydrogen sulphide, which consists in: passing a hydrogen sulphide bearing gas into contact with a solution of sodium carbonate containing in suspension magnesium hydroxide, the sodium carbonate acting as the carrier for the absorption of hydrogen sulphide by the magnesium hydroxide in suspension; then heating the suspension to expel the hydrogen sulphide to regenerate the solution-suspension; and cooling the regenerated solution-suspension and passing it back to the gas treatment stage; substantially as specified.

5. The process of producing hydrogen sulphide, which consists in: passing a hydrogen sulphide bearing gas into contact with a solution of sodium carbonate containing in suspension a magnesium compound having an affinity for sulphur, the sodium carbonate acting as the carrier for the absorption of hydrogen sulphide by the magnesium compound having an affinity for sulphur in suspension; then heating the suspension to expel the hydrogen sulphide to regenerate the solution-suspension; and cooling the regenerated solution-suspension and passing it back to the gas treatment stage; substantially as specified.

6. The process of producing hydrogen sulphide, which consists in: passing a hydrogen sulphide bearing gas into contact with an alkaline solution containing in suspension a magnesium compound having an affinity for sulphur, the alkaline solution acting as the carrier for the absorption of hydrogen sulphide by the magnesium compound having an affinity for sulphur in suspension; then heating the suspension to expel the hydrogen sulphide to regenerate the solution-suspension; and cooling the regenerated solution-suspension and passing it back to the gas treatment stage; substantially as specified.

7. The process of producing hydrogen sulphide, which consists in: passing a hydrogen sulphide bearing gas into contact with an alkaline solution containing in suspension a magnesium compound having an affinity for sulphur, to absorb the hydrogen sulphide from the gas; and then subjecting the solution-suspension containing the absorbed hydrogen sulphide to a heating operation to liberate the hydrogen sulphide and to regenerate the solution-suspension for further absorption of hydrogen sulphide from gases; substantially as specified.

8. In a process of producing hydrogen sulphide, the passage of a gas containing hydrogen sulphide into contact with an alkaline solution containing in suspension a magnesium compound having an affinity for sulphur, to absorb the hydrogen sulphide from the gas, combined with the subsequent recovery of the absorbed hydrogen sulphide from the solution-suspension and concurrent regeneration of the solution-suspension to render it available for further absorption of hydrogen sulphide from gases; substantially as specified.

RALPH E. HALL.